United States Patent
Bewermeyer et al.

(10) Patent No.: US 11,971,109 B2
(45) Date of Patent: Apr. 30, 2024

(54) VALVE AND LIQUID TANK FOR A LIQUID SYSTEM, LIQUID SYSTEM FOR A VEHICLE, AND VEHICLE

(71) Applicant: HELLA GmbH & Co. KGaA, Lippstadt (DE)

(72) Inventors: Frank Bewermeyer, Paderborn (DE); Finn Malte Fischer, Aachen (DE); Benjamin Grothe, Wickede (DE); Dominik Niess, Selm (DE); Christian Praest, Langenberg (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/227,434

(22) Filed: Jul. 28, 2023

(65) Prior Publication Data
US 2023/0366474 A1 Nov. 16, 2023

Related U.S. Application Data

(63) Continuation of application No. PCT/EP2022/051129, filed on Jan. 19, 2022.

(30) Foreign Application Priority Data

Jan. 29, 2021 (DE) .................... 10 2021 102 023.9

(51) Int. Cl.
| | |
|---|---|
| *F16K 11/085* | (2006.01) |
| *F01P 7/14* | (2006.01) |
| *F01P 11/02* | (2006.01) |

(52) U.S. Cl.
CPC ............. *F16K 11/085* (2013.01); *F01P 7/14* (2013.01); *F01P 11/029* (2013.01); *F01P 2007/146* (2013.01)

(58) Field of Classification Search
CPC ..... F16K 11/085; F01P 7/14; F01P 2007/146; F01P 11/04; F01P 11/029
See application file for complete search history.

(56) References Cited

U.S. PATENT DOCUMENTS

| | | | |
|---|---|---|---|
| 2006/0118066 A1* | 6/2006 | Martins | F16K 11/0856 123/41.08 |
| 2015/0354716 A1 | 12/2015 | Morein | |
| 2017/0152957 A1 | 6/2017 | Roche et al. | |

FOREIGN PATENT DOCUMENTS

| | | |
|---|---|---|
| CN | 110843465 A | 2/2020 |
| EP | 3885169 A1 | 9/2021 |

(Continued)

OTHER PUBLICATIONS

International Search Report dated May 31, 2022 in corresponding application PCT/EP2022/051129.

*Primary Examiner* — Jacob M Amick
(74) *Attorney, Agent, or Firm* — Muncy, Geissler, Olds & Lowe, P.C.

(57) ABSTRACT

A valve for a liquid system of a vehicle having a valve housing with a multiplicity of valve housing openings, a valve body that is arranged in the valve housing so as to be rotatable about a rotational axis and has at least one flow-conducting connecting passage for the flow-conducting connection of at least two valve housing openings of the multiplicity of valve housing openings. A valve seal is arranged between the valve housing and the valve body. A valve actuator rotates the valve body about the rotational axis, and a multiplicity of flow passages corresponding to the valve housing openings for the flow-conducting connection of the valve to a remainder of the liquid system, are provided. The flow passages are jointly formed from a single first passage shell and a single second passage shell. The first passage shell is simultaneously formed as the valve housing.

12 Claims, 4 Drawing Sheets

(56) References Cited

FOREIGN PATENT DOCUMENTS

GB            1549100 A     7/1979
GB            1554712 A    10/1979

\* cited by examiner

VALVE AND LIQUID TANK FOR A LIQUID SYSTEM, LIQUID SYSTEM FOR A VEHICLE, AND VEHICLE

This nonprovisional application is a continuation of International Application No. PCT/EP2022/051129, which was filed on Jan. 19, 2022, and which claims priority to German Patent Application No. 10 2021 102 023.9, which was filed in Germany on Jan. 29, 2021, and which are both herein incorporated by reference.

BACKGROUND OF THE INVENTION

Field of the Invention

The present invention relates to a valve for a liquid system, a liquid tank for a liquid system, a liquid system of a vehicle, and a vehicle.

Description of the Background Art

Valves and liquid tanks for liquid systems, liquid systems, and vehicles are already known from the prior art in numerous embodiments. The known valves for liquid systems of vehicles in this case comprise a valve housing with a multiplicity of valve housing openings, a valve body that is arranged in the valve housing so as to be rotatable about a rotational axis and has at least one flow-conducting connecting passage for the flow-conducting connection of at least two valve housing openings of the multiplicity of valve housing openings, a valve seal that is arranged between the valve housing and the valve body and has valve seal openings corresponding to the valve housing openings, a valve actuator for automatically rotating the valve body about the rotational axis, and a multiplicity of flow passages corresponding to the valve housing openings for the flow-conducting connection of the valve to a remainder of the liquid system. The flow passages known from the prior art in this regard usually have a circular internal contour and a circular external contour in cross section.

SUMMARY OF THE INVENTION

It is therefore an object of the present invention to improve a valve for a liquid system, a liquid tank for a liquid system, a liquid system of a vehicle, and a vehicle.

In an exemplary embodiment, this object is attained by a valve for a liquid system of a vehicle, which is characterized in that the flow passages are jointly formed from a single first passage shell and a single second passage shell, wherein the first passage shell is simultaneously formed as the valve housing, which can be joined to the second passage shell to form the flow passages. In addition, this object is attained by a liquid tank for a liquid system of a vehicle, a liquid system of a vehicle, and a vehicle. The vehicle can be, for example, a land vehicle designed as a motor vehicle. Strictly by way of example, only a motor vehicle designed as an electric vehicle or as a so-called hybrid vehicle are mentioned here. However, the invention can also be used to good advantage with other land vehicles as well as with aircraft and watercraft. The valve according to the invention can preferably be a so-called multiway valve. This is not imperative, however. The dependent claims relate to advantageous improvements of the invention.

An important advantage of the invention is, in particular, that a valve for a liquid system, a liquid tank for a liquid system, a liquid system of a vehicle, and a vehicle are improved.

On account of the design according to the invention of the valve for a liquid system of a vehicle, of the liquid tank for a liquid system of a vehicle, of the liquid system for a vehicle, and of the vehicle, it is possible to implement the aforementioned valve, the aforementioned liquid tank, the aforementioned liquid system for a vehicle, and the aforementioned vehicle in a manner that is especially simple in terms of design and manufacturing. Furthermore, a centralization of the components of a liquid system for a vehicle is made possible as a result. At the same time, a flow-optimized shape of the flow passages of the liquid system can be implemented easily in terms of manufacturing in this case. The reasons for this include the fact that, for example, the invention makes it possible that the flow passages can each also have cross sections with interior contours that are not circular, in contrast to the prior art. For example, cross sections with essentially rectangular internal contours are possible in which a clear opening of the relevant flow passage is larger than that of a cross section having a circular internal contour. Corners of an, e.g., rectangular internal contour can be rounded for the purpose of additional optimization of the flow in this case.

In principle, the valve according to the invention for a liquid system of a vehicle can be freely chosen within broad suitable limits in terms of type, mode of operation, material, dimensioning, and arrangement in the liquid system.

An especially advantageous improvement of the valve according to the invention for a liquid system of a vehicle provides that the flow passages on the valve housing side are designed to extend obliquely upward or downward at an angle to the rotational axis of greater than 0° and less than 90°, preferably of 30° to 60°. Especially simple production and manufacture of the valve according to the invention is made possible in this way. For example, it is possible as a result to route the flow passages in an especially suitable manner for the individual case in question, in particular in a flow-optimized manner. By means of this improvement, curved layouts of the flow passages, in particular in the sections of the flow passages on the valve housing side, can be produced without difficulty, for example through the use of slides that are moved obliquely to the rotational axis of the valve body in the case of valve housings designed as injection molded plastic parts. The aforementioned slides can be moved obliquely upward or obliquely downward so that a curved layout of the flow passage corresponding thereto can be implemented easily in terms of manufacturing. The aforementioned advantages apply in the case of the preferred embodiment of this improvement, in particular.

Another especially advantageous improvement of the valve according to the invention for a liquid system of a vehicle provides that the valve housing and/or the valve body is/are designed to be moldable in such a manner that a seal side of the valve housing and/or of the valve body that faces the valve seal is designed to be essentially flash-free after a demolding of the valve housing and/or of the valve body. In this way, it is ensured that the valve seal, and thus the valve according to the invention, permits a long service life, even without any labor-intensive post-processing of the aforementioned seal sides. In manufacturing terms, this can be implemented, for example, in such a manner that mold separation at the seal side of the valve housing is avoided by design with the aforementioned injection molded plastic part.

A further advantageous improvement of the valve according to the invention for a liquid system of a vehicle provides that the valve housing is designed as an integral part of a liquid tank of the liquid system, preferably of a coolant tank of the vehicle for storage of coolant carried in the liquid system designed as a coolant system. In this way, the number of components of the liquid system is reduced, on the one hand. The logistics, the inventory management, and the manufacturing of the liquid system for a vehicle are simplified accordingly. On the other hand, a very compact, and therefore space-saving, construction of the liquid system is made possible by this means.

An advantageous improvement of the aforementioned embodiment of the valve according to the invention for a liquid system of a vehicle provides that a tank housing of the liquid tank is designed as multiple shells and has a multiplicity of tank housing shells, wherein the valve housing is simultaneously designed as one of the tank housing shells of the tank housing, preferably that the valve housing is designed as a bottommost tank housing shell of the tank housing. As a result, the tank housing of the liquid tank with the valve housing integrated therein can be implemented in a manner that is especially simple in terms of design and manufacturing. This applies to the preferred embodiment of this improvement, in particular. For example, the tank housing can be designed as three shells, and have a topmost tank housing shell, a middle tank housing shell, and a bottommost tank housing shell. This is not imperative, however.

The liquid tank according to the invention for a liquid system of a vehicle can be freely chosen within broad suitable limits in terms of type, mode of operation, material, dimensioning, and arrangement in the liquid system and on the vehicle, analogously to the valve according to the invention.

Corresponding to the last-mentioned improvement of the valve according to the invention, an advantageous improvement of the liquid tank according to the invention for a liquid system of a vehicle provides that the tank housing is designed as multiple shells and has a multiplicity of tank housing shells, wherein one of the tank housing shells is simultaneously designed as the valve housing, preferably that the valve housing is designed as a bottommost tank housing shell of the tank housing.

In accordance with the above remarks regarding the liquid tank according to the invention for a liquid system of a vehicle, an advantageous improvement of the liquid system according to the invention of a vehicle provides that the liquid tank is designed as a valve housing for a valve for the liquid system of the vehicle. Also, the the tank housing can be designed as multiple shells and has a multiplicity of tank housing shells, wherein one of the tank housing shells is simultaneously designed as the valve housing, preferably in that the valve housing is designed as a bottommost tank housing shell of the tank housing.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

The vehicle is designed here as a motor vehicle, for example, as an all-electric vehicle.

In the present example, the liquid system 2 for the vehicle is designed as a coolant system for cooling the traction battery and the drive motor along with the corresponding power electronics, as well as for cooling a refrigerant circuit for air conditioning a passenger compartment of the vehicle. The traction battery, the drive motor with the corresponding power electronics, and the refrigerant circuit of the vehicle and are designed, for example, in a manner known per se to the person skilled in the art.

Figure 1:
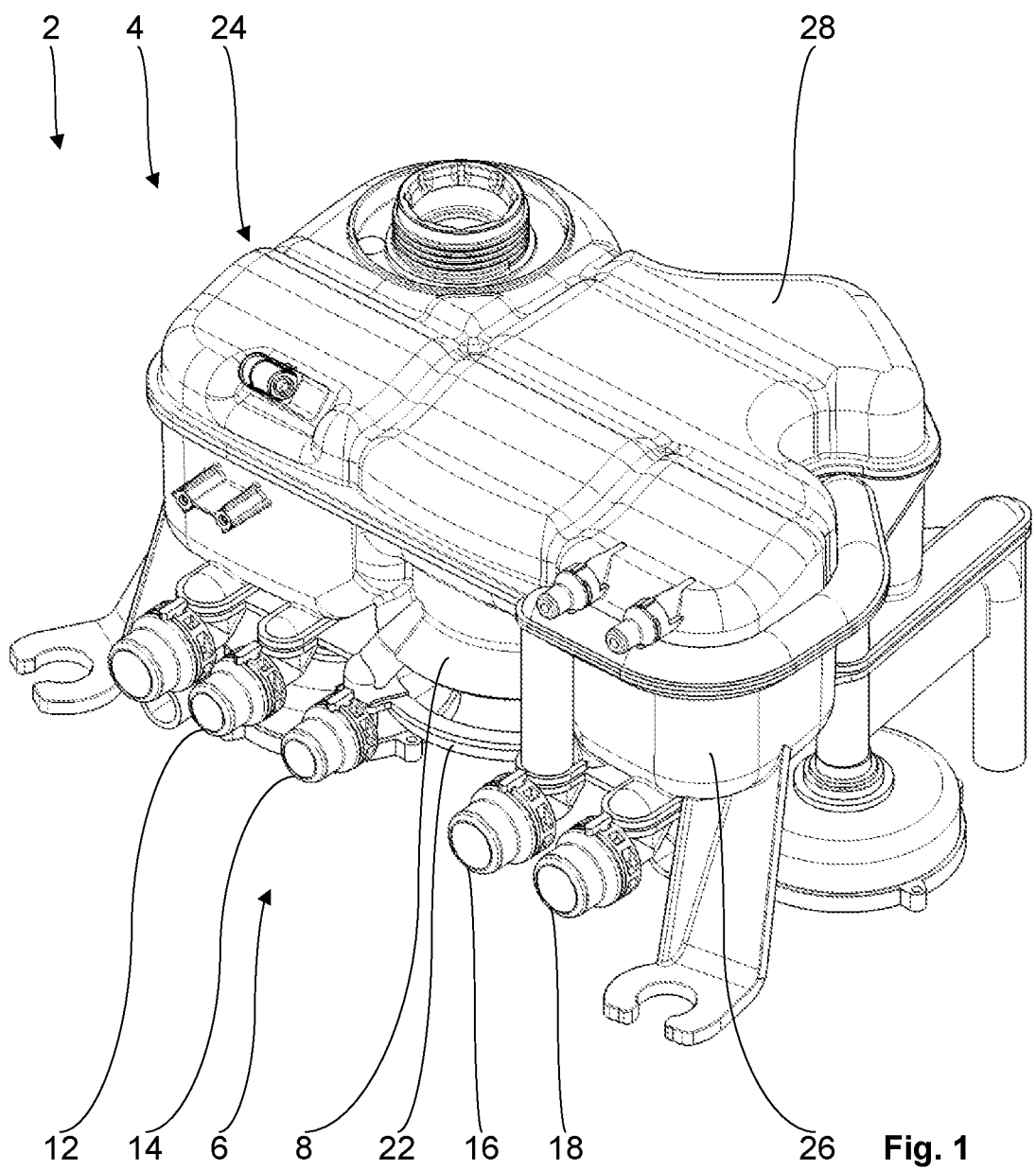
FIG. 1 shows an example of a liquid system according to the invention in a partial, perspective view.

The liquid system 2 designed as a coolant system includes a liquid tank 4 designed as a coolant tank for storage of a liquid of the vehicle, which liquid is implemented as a coolant; a total of three liquid circuits connected in a flow-conducting manner to the liquid tank and designed as coolant circuits in which the liquid circulates; and a valve 6 connected in a flow-conducting manner to the liquid circuits on the one hand and to the liquid tank on the other hand for controlling the liquid flows implemented as coolant flows of the liquid in the liquid system 2. See FIG. 1 in this regard.

The valve 6 is designed here as a so-called multiway valve, and comprises a valve housing 8 with a multiplicity of valve housing openings, a valve body that is arranged in the valve housing 8 so as to be rotatable about a rotational axis 10 and has at least one flow-conducting connecting passage for the flow-conducting connection of at least two valve housing openings of the multiplicity of valve housing openings, a valve seal that is arranged between the valve housing 8 and the valve body and has valve seal openings corresponding to the valve housing openings, a valve actuator for automatically rotating the valve body about the rotational axis 10, and a multiplicity of flow passages 12, 14, 16, 18, 20 corresponding to the valve housing openings for the flow-conducting connection of the valve 6, namely of the valve housing openings, to a remainder of the liquid system 2.

Figure 2:
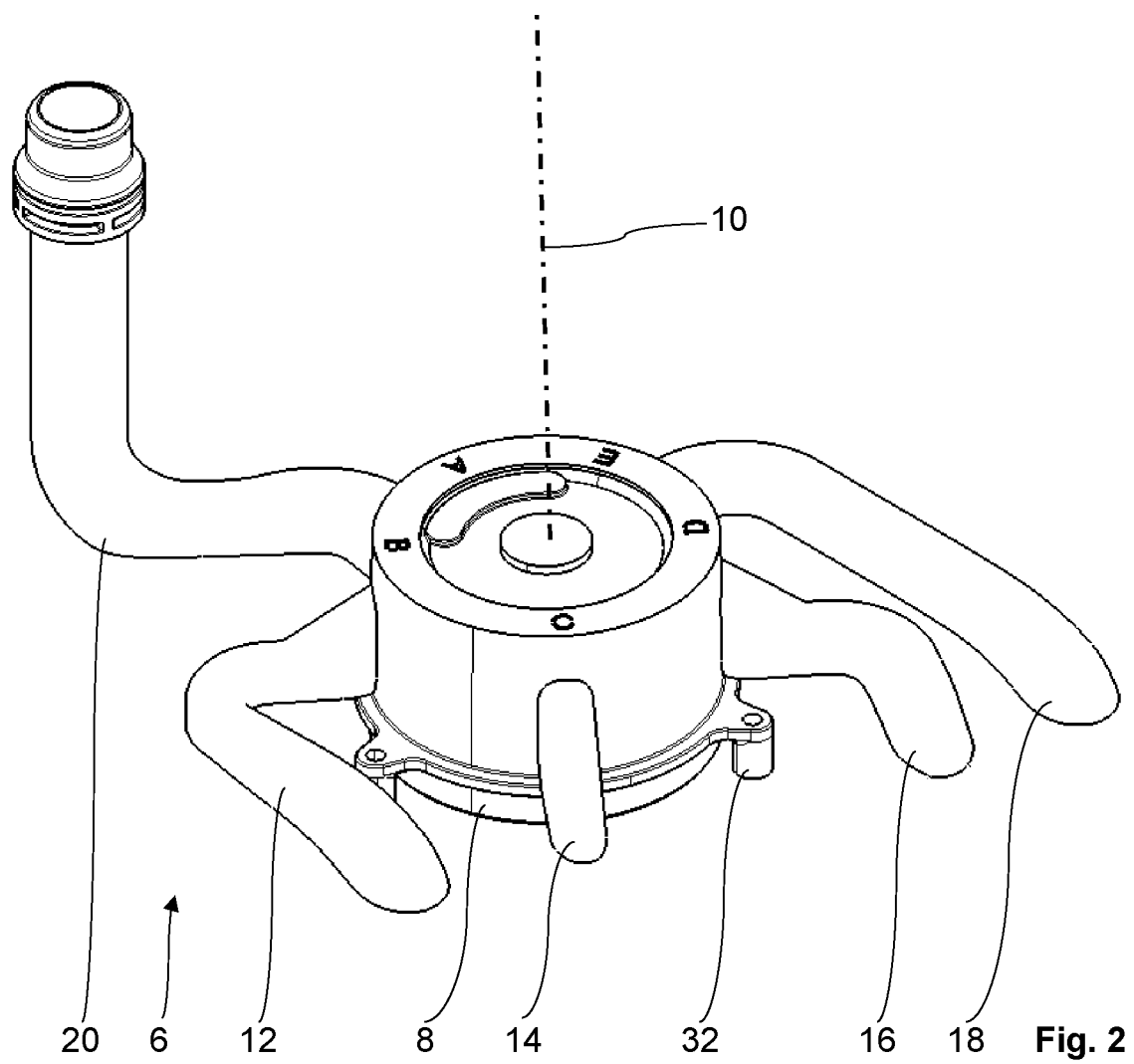
FIG. 2 shows a valve in a first partial, perspective view component drawing.
Figure 3:
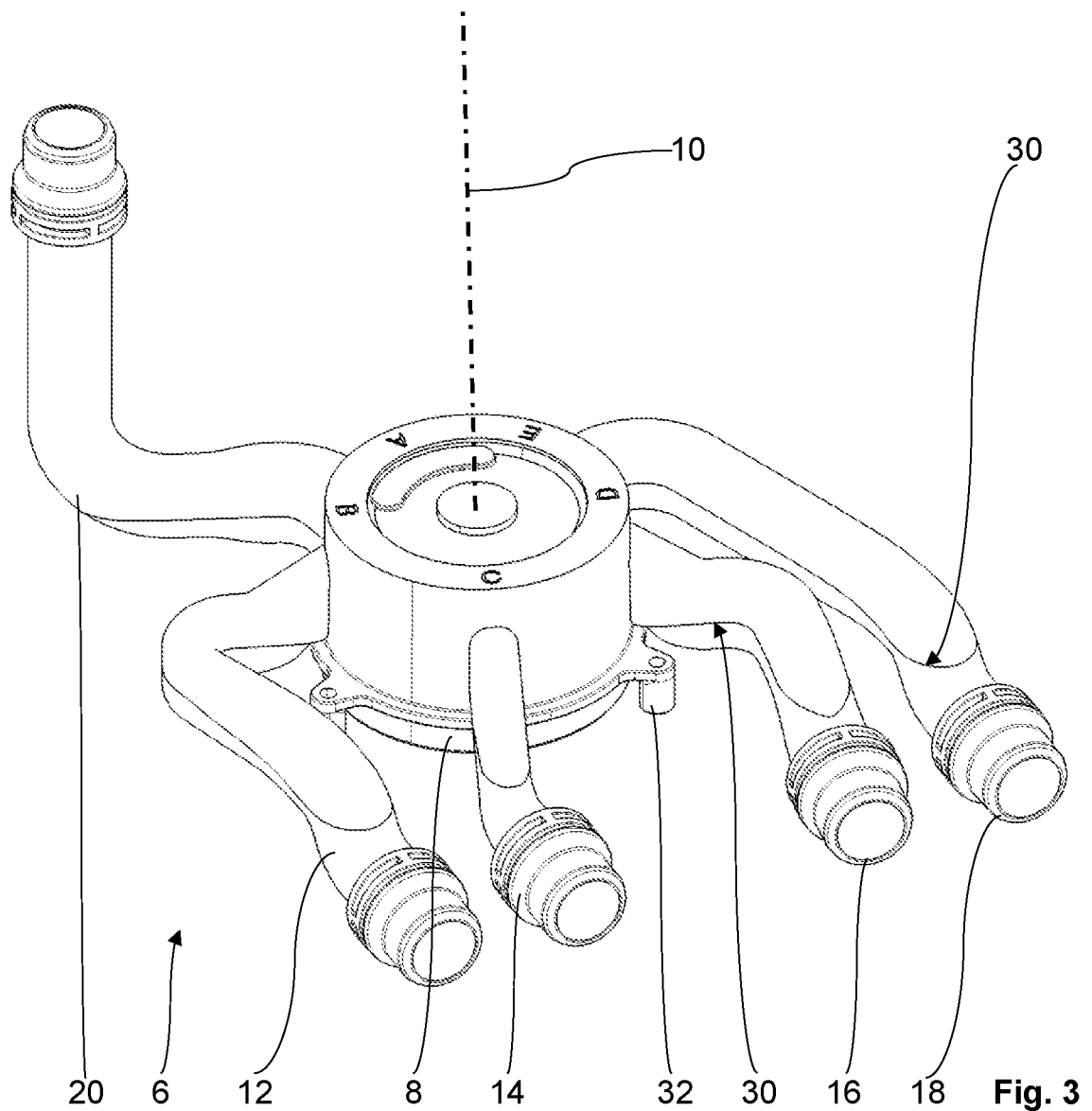
FIG. 3 shows a in a second partial, perspective view component drawing.
Figure 4:
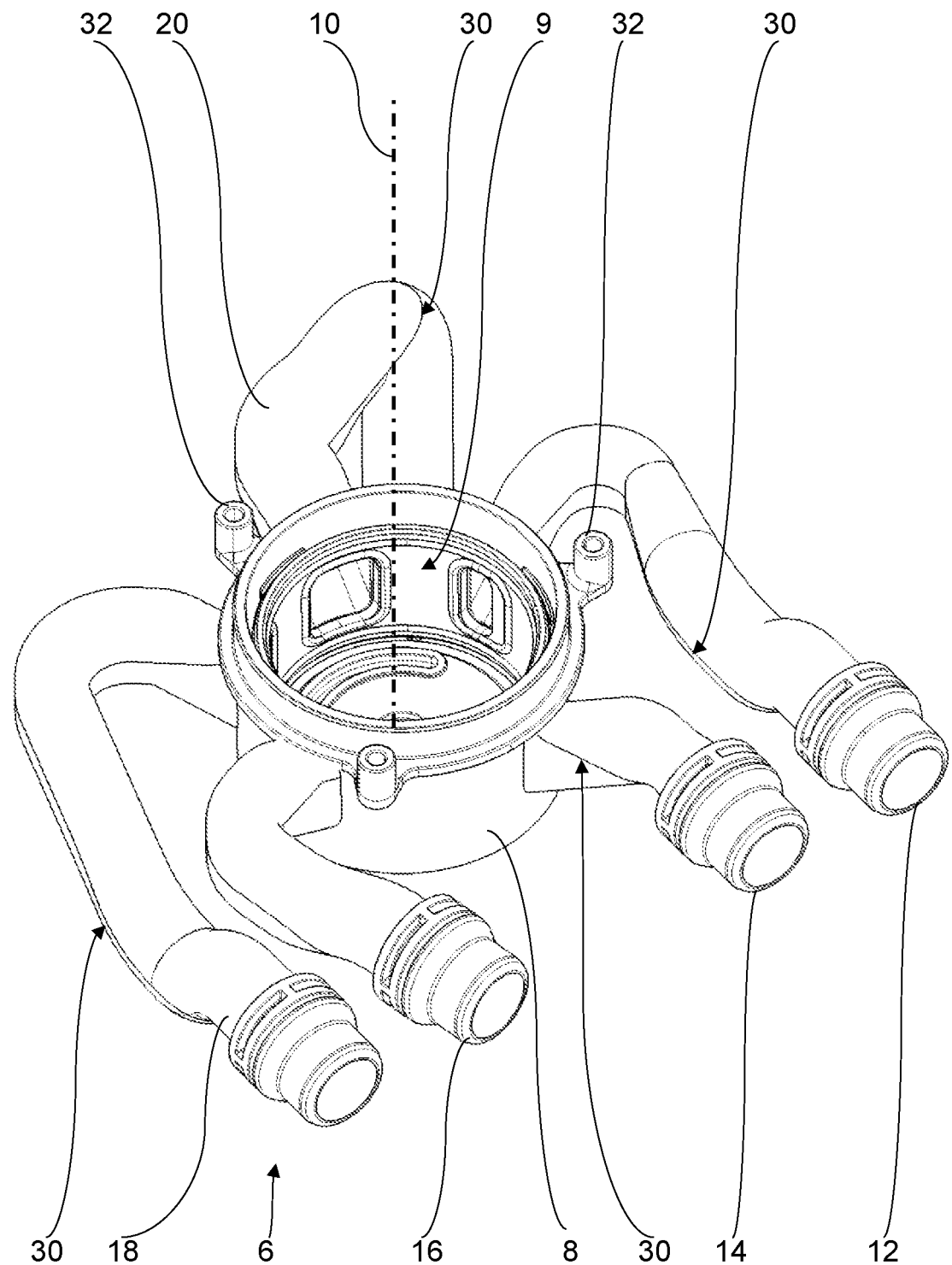
FIG. 4 shows a valve in a third partial, perspective view component drawing.

The valve housing openings of the valve housing 8 of the valve 6 are only partially shown in FIG. 4, but are labeled in FIGS. 2 and 3 with the letters A to E marked on the valve housing 8. The valve body with the at least one connecting passage, the valve seal with the valve seal openings designed to correspond to the valve housing openings, and the valve actuator are not shown in FIGS. 1 to 4.

According to the invention, the flow passages 12, 14, 16, 18, 20 are jointly formed from a single first passage shell and a single second passage shell 22, wherein the first passage shell is simultaneously formed as the valve housing 8, which can be joined to the second passage shell 22 to form the flow passages 12, 14, 16, 18, 20. The valve housing 8 designed as the first passage shell, and the second passage shell 22, are each designed as an injection molded plastic part in the present exemplary embodiment. The two passage shells 8, 22 are joined to one another by plastic welding for the purpose of forming the flow passages 12, 14, 16, 18, 20. Other joining methods are also absolutely possible, however.

The person skilled in the art will choose the joining method suitable for joining the two passage shells according to the requirements of the individual case. Strictly by way of example, mention is made here only of adhesive bonding methods. For the purpose of flow optimization, the flow passages 12, 14, 16, 18, 20 of the present exemplary embodiment each have cross sections with essentially rectangular internal contours, in which a clear opening of the relevant flow passage 12, 14, 16, 18, 20 is larger than that of a cross section having a circular internal contour. Corners of these rectangular internal contours are rounded for the purpose of additional optimization of the flow in this case. In this regard, see the valve housing openings of the valve housing 8 that are partially evident from FIG. 4, whereby the internal contour of the relevant flow passage 12, 20 corresponding thereto, as well as its clear opening, is evident.

As is evident from FIGS. 2 to 4 in particular, the flow passages 12, 14, 16, 18, 20 on the valve housing side are designed here to extend obliquely upward or downward at an angle to the rotational axis 10 of greater than 0° and less than 90°, namely of 30° to 60°. During production of the valve housing 8 that is simultaneously designed as the first passage shell, the aforementioned slides are moved obliquely downward, so that the curved layout of the flow passages 12, 14, 16, 18, 20 that is evident from FIGS. 1 to 4 can be implemented easily in terms of manufacturing in a section of the flow passages 12, 14, 16, 18, 20 on the valve housing side in each case.

Furthermore, the valve housing 8 in the present exemplary embodiment is designed to be moldable in such a manner that a seal side 9 of the valve housing 8 that faces the valve seal is designed to be essentially flash-free after a demolding of the valve housing 8. In manufacturing terms, this is implemented here in that, for example, mold separation at the seal side 9 of the valve housing 8 is avoided by design with the aforementioned injection molded plastic part, namely the valve housing 8.

In addition, the valve housing 8 is designed here as an integral part of the liquid tank 4 of the liquid system 2 of the vehicle, which tank is designed as a coolant tank for storage of the coolant carried in the coolant circuits. For this purpose, a tank housing 24 of the liquid tank 4 is designed as three shells, wherein the valve housing 8 is simultaneously designed as a tank housing shell of the tank housing 24, namely that the valve housing 8 is designed as a bottommost tank housing shell of the tank housing 24. In addition to the valve housing 8 designed as the bottommost tank housing shell, the tank housing 24 also has a middle tank housing shell 26 and a topmost tank housing shell 28. See FIG. 1 in this regard. Each of the two tank housing shells 26, 28 are likewise designed as injection molded plastic parts and are plastic welded to one another and to the valve housing 8 simultaneously designed as the bottommost tank housing shell, analogously to the two aforementioned passage shells 8, 22 to form the flow passages 12, 14, 16, 18, 20.

Correspondingly, the tank housing 24 of the liquid tank 4 designed as coolant tank is simultaneously designed here as the valve housing 8 for the valve 6 for the liquid system 2 of the vehicle. Consequently, in the present exemplary embodiment, the liquid tank 4 designed as coolant tank comprises a total of three shells, namely the bottommost tank housing shell that is simultaneously designed as valve housing 8 and first passage shell, the middle tank housing shell 26 that is plastic welded to the bottommost tank housing shell 8, and the topmost tank housing shell 28 that is plastic welded to the middle tank housing shell 26. See FIG. 1 in this regard.

FIGS. 2 and 3 in this case are strictly theoretical views of the actual valve housing 8, which have been created solely for the purpose of improved clarity. In reality, the valve housing 8, as explained above, is an integral part of the tank housing 24 of the liquid tank 4. The surface with the letters A, B, C, D, E labeling the valve housing openings of the valve housing 8 that is evident from FIGS. 2 and 3 is in practice designed as the bottommost tank housing shell and is not configured solely to form the valve housing 8 in itself and the first passage shell to form the flow passages 12, 14, 16, 18, 20.

The vehicle according to the invention with the liquid system according to the invention in accordance with the present exemplary embodiment is explained below in detail on the basis of FIGS. 1 to 4.

First of all, the individual tank housing shells, namely the valve housing 8 simultaneously designed as first passage shell and bottommost tank housing shell, the middle tank housing shell 26, and the topmost tank housing shell 28 of the tank housing 24 of the liquid tank 4, as well as the second passage shell 22, are each produced individually as injection molded plastic parts, which is to say separately from one another, in a manner known to the person skilled in the art.

Next, the individual tank housing shells 8, 26, 28 are plastic welded to one another, resulting in the tank housing 24 of the liquid tank 4. See FIG. 1 in this regard.

As already discussed above, the valve housing 8 shown in a component drawing in each of FIGS. 2 to 4 is designed as an integral part of the aforementioned liquid tank 4, namely of the tank housing 24.

In FIG. 2, the valve housing 8 simultaneously designed as first passage shell is shown in a component drawing, so the valve housing 8 according to FIG. 2 has not yet been joined to the second passage shell 22.

For the purpose of forming the flow passages 12, 14, 16, 18, 20, the second passage shell 22 is now plastic welded to the valve housing 8 that is simultaneously designed as first passage shell. Accordingly, the flow passages 12, 14, 16, 18, 20 result, as is evident from FIGS. 3 and 4. The seams 30 produced during the aforementioned plastic welding are each clearly visible in FIGS. 3 and 4. See also FIGS. 2 to 4, in particular FIGS. 2 and 3 in combination, in this regard.

Finally, the valve 6 is now completed by the means that first the valve seal and then the valve body of the valve 6 are inserted and secured in the valve housing 8 in a manner known per se to the person skilled in the art. For this purpose, the valve 6 has, for example, an end plate, which seals the valve 6 at the bottom. In the present exemplary embodiment, this end plate is mechanically joined to the valve housing 8 by means of three screws. In this regard, see FIGS. 2 to 4, in which a total of three screw bosses 32 of the valve housing 8 are depicted for screwing in the aforementioned screws.

On account of the design according to the invention of the valve for a liquid system of a vehicle, of the liquid tank for a liquid system of a vehicle, of the liquid system for a vehicle, and of the vehicle, according to the present exemplary embodiment, it is possible to implement the aforementioned valve 6, the aforementioned liquid tank 4, the aforementioned liquid system 2, and the aforementioned vehicle in a manner that is especially simple in terms of design and manufacturing. Furthermore, a centralization of the components of the liquid system 2 for the vehicle is made possible as a result. At the same time, a flow-optimized shape of the flow passages 12, 14, 16, 18, 20 of the liquid system 2 can be implemented easily in terms of manufacturing in this case. The reasons for this include the fact that, for example, the invention according to the present embodiment makes it possible that the flow passages 12, 14, 16, 18, 20 can each also have cross sections with interior contours that are not circular, in contrast to the prior art. For example, the cross sections here are designed with essentially rectangular internal contours, in which a clear opening of the relevant flow passage 12, 14, 16, 18, 20 is larger than that of a cross section having a circular internal contour. Corners of these rectangular internal contours are rounded for the purpose of additional optimization of the flow in this case.

The invention is not limited to the present exemplary embodiment. For example, the invention can also be used to good advantage with other types of vehicles. This applies not only to land vehicles, but also to aircraft and watercraft. See also the introductory part of the specification in this regard.

In particular, the invention is not restricted to the design and manufacturing details of the exemplary embodiment. For example, the number of flow passages and of the corresponding valve housing openings and valve seal openings is not restricted to the number in the exemplary embodiment, but instead can be freely chosen within the technical constraints according to the requirements of the individual case. The same applies to the spatial arrangement of the individual flow passages, which likewise can be freely chosen as a function of the spatial conditions of the use case in question.

It is also possible that the tank housing is formed only of two tank housing shells. However, any other practical number of tank housing shells is possible in principle.

In contrast to the present exemplary embodiment, the valve can also be attached by means of its valve housing merely to the tank, namely the tank housing. Accordingly, an integration of the valve housing in the tank housing is not absolutely imperative. Furthermore, the valve can also be attached to other suitable components of the vehicle, for example a vehicle body or a drive motor of the vehicle.

Of course, it is not only in liquid systems designed as coolant systems of a vehicle that the invention can be employed to good advantage. Accordingly, the invention can be employed for a multiplicity of quite different use cases.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A valve for a liquid system of a vehicle, the valve comprising:
    a valve housing with at least two valve housing openings;
    a valve body arranged in the valve housing so as to be rotatable about a rotational axis;
    at least one flow-conducting connecting passage for a flow-conducting connection of at least two valve housing openings of the at least two valve housing openings;
    a valve seal arranged between the valve housing and the valve body and has valve seal openings corresponding to the valve housing openings;
    a valve actuator for automatically rotating the valve body about the rotational axis; and
    at least two flow passages corresponding to the valve housing openings for a flow-conducting connection of the valve to a remainder of the liquid system,
    wherein the at least two flow passages are jointly formed from a single first passage shell and a single second passage shell, and
    wherein the single first passage shell is formed as the valve housing, which is joined to the single second passage shell to form the at least two flow passages.

2. The valve according to claim 1, wherein the at least two flow passages on a valve housing side are designed to extend obliquely upward or downward at an angle to the rotational axis of greater than 0° and less than 90°.

3. The valve according to claim 1, wherein the valve housing and/or the valve body are designed to be moldable in such a manner that a seal side of the valve housing and/or of the valve body that faces the valve seal is designed to be essentially flash-free after a demolding of the valve housing and/or of the valve body.

4. The valve according to claim 1, wherein the valve housing is designed as an integral part of a liquid tank of the liquid system or a coolant tank of the vehicle for storage of coolant carried in the liquid system designed as a coolant system.

5. The valve according to claim 4, wherein a tank housing of the liquid tank is designed as multiple shells and has a plurality of tank housing shells, wherein the valve housing is a bottommost tank housing shell of the tank housing shells of the tank housing.

6. A liquid tank for a liquid system of a vehicle, the liquid tank comprising:
    a tank housing for storage of a liquid of the vehicle, wherein the tank housing is simultaneously designed as a valve housing for a valve for the liquid system of the vehicle, and
    wherein the valve is designed according to claim 1.

7. The liquid tank according to claim 6, wherein the tank housing is designed as multiple shells and has a plurality of tank housing shells, wherein the valve housing is a bottommost tank housing shell of the tank housing shells of the tank housing.

8. A liquid system of a vehicle, comprising:
    a liquid tank for storage of a liquid of the liquid system;
    at least one liquid circuit, in which the liquid circulates, connected in a flow-conducting manner to the liquid tank; and
    the valve according to claim 1 connected in a flow-conducting manner to the liquid circuit and/or to the liquid tank for controlling at least one liquid flow of the liquid in the liquid system.

9. The liquid system according to claim 8, wherein the liquid tank is designed as a tank housing for storage of the liquid of the vehicle, and wherein the tank housing is simultaneously designed as the valve housing for the valve or wherein the tank housing is designed as multiple shells and has a plurality of tank housing shells, wherein the valve housing is a bottommost tank housing shell of the tank housing shells of the tank housing.

10. A vehicle comprising the liquid system according to claim 8, wherein the liquid system is a coolant system of the vehicle.

11. The valve according to claim 1, wherein the at least two flow passages on a valve housing side are designed to extend obliquely upward or downward at an angle to the rotational axis of 30° to 60°.

12. The valve according to claim 1, wherein the single first passage shell is joined to the single second passage shell to form the at least two flow passages, such that a portion of a circumference of each of the at least two flow passages is formed by the single first passage shell and another portion of the circumference of each of the at least two flow passages is formed by the single second passage shell, and wherein seams are provided along each of the at least two flow passages at the joining of the single first passage shell and the single second passage shell.

\* \* \* \* \*